(12) United States Patent
Canosa

(10) Patent No.: US 7,583,189 B2
(45) Date of Patent: Sep. 1, 2009

(54) METHODS FOR MANAGING REMOTE DEVICES OVER AN INSTANT MESSAGING NETWORK AND SYSTEMS THEREOF

(76) Inventor: John T. Canosa, 31 High Point Dr., Spencerport, NY (US) 14559

( * ) Notice: Subject to any disclaimer, the term of this patent is extended or adjusted under 35 U.S.C. 154(b) by 297 days.

(21) Appl. No.: 11/726,006

(22) Filed: Mar. 20, 2007

(65) Prior Publication Data
US 2008/0231414 A1 Sep. 25, 2008

(51) Int. Cl.
*G08B 1/00* (2006.01)
*G06F 15/16* (2006.01)
*H04M 1/725* (2006.01)

(52) U.S. Cl. .................. 340/531; 340/506; 340/539.1; 340/525; 455/412.2; 719/318; 709/206

(58) Field of Classification Search ................. 340/531
See application file for complete search history.

(56) References Cited

U.S. PATENT DOCUMENTS

| | | | |
|---|---|---|---|
| 6,430,602 | B1 | 8/2002 | Kay et al. |
| 6,993,555 | B2 | 1/2006 | Kay et al. |
| 2003/0093710 | A1 | 5/2003 | Hashimoto et al. |
| 2003/0117280 | A1 | 6/2003 | Prehn |
| 2004/0158629 | A1 | 8/2004 | Herbeck et al. |
| 2005/0060186 | A1 | 3/2005 | Blowers et al. |
| 2005/0102362 | A1 | 5/2005 | Price et al. |
| 2005/0213563 | A1 | 9/2005 | Shaffer et al. |
| 2006/0186986 | A1 | 8/2006 | Ma et al. |

*Primary Examiner*—Donnie L Crosland
(74) *Attorney, Agent, or Firm*—Nixon Peabody LLP

(57) ABSTRACT

A method and system for managing one or more devices includes identifying at least one condition related to one of one or more devices to initiate an instant message communication between one of the one or more devices and one of one or more computing systems. An instant message service is invoked based on the identified condition and an instant message is generated based on the identified condition. The generated instant message is provided at the one of the computing systems in which the instant message communication has been initiated.

33 Claims, 4 Drawing Sheets

METHODS FOR MANAGING REMOTE DEVICES OVER AN INSTANT MESSAGING NETWORK AND SYSTEMS THEREOF

FIELD OF THE INVENTION

The present invention generally relates to systems and methods for managing devices and, more particularly, to systems for monitoring remote devices over an instant messaging network and methods thereof.

BACKGROUND

Connectivity to remote equipment in the field has become a common practice for many original equipment manufacturers (OEMs). Frequently, this equipment is distributed over a broad geographical region and often involves hundreds, if not thousands or tens of thousands, of individual devices.

Currently, solutions to obtain this connectivity involve the use of a centralized server system between the OEMs and the remote equipment. These solutions require all remote devices to report monitoring and alarm data back to a centralized server system. The collected monitoring and alarm data is only made available to OEMs through monitoring applications running within the centralized server system. Quite often these connectivity and monitoring applications are customized for the particular centralized server system and OEM. As a result, users must learn the particular intricacies of each of these connectivity and monitoring applications before they can become productive.

These solutions may also provide a "data tunneling" capability that allows for the use of existing, OEM developed, diagnostic applications over the Internet through client/server connections, such as telnet and HTTP. Once again, with this data tunneling capability all communications are targeted to a central server system with a specialized switching server that establishes and maintains a connection between the OEM and centralized server system. Since these switching servers are a typical point of failure, switching servers are often clustered to improve performance and availability.

Accordingly, with these existing solutions an OEM can remotely monitor, diagnose, and repair problems with the equipment. As a result, OEMs can be more proactive in preventing and addressing problems with remote equipment before they become serious. Additionally, with these existing OEMs can identify and provide other value added services, such as automatically identifying when remote equipment is or will be in need of replenishment of consumables which can be provided by the OEM.

Unfortunately, these solutions which utilize a centralized server system have at least two significant drawbacks. First, the need for all of the data to pass through a centralized server system can cause significant scalability problems. When tens of thousands or hundreds of thousands of remote devices are being monitored, the need for all of the data to pass through a centralized server system can negatively impact overall performance and user experience. Additionally, with larger numbers of remote devices, larger scales of data must pass through switching servers in the centralized server system and, as mentioned earlier, these switching servers are typical points of failure. Clustering of switching servers is often used to address this issue, but at the expense of a much more complex and expensive centralized server system.

Second, these solutions are often customized for each particular OEM forcing users to learn new and unfamiliar applications and user paradigms. This creates a significant learning curve and expense and can impede any productivity gains obtained by using these solutions. By way of example only, to use one of these solutions to run an OEM developed diagnostic tool, a user has to log in to the central server system, find the remote device they wish to connect, and then request the connection. Often this process has significant wait times during the login, identification, and connection process and requires significant training on the part of the user to execute.

SUMMARY

A method for managing one or more devices in accordance with embodiments of the present invention includes identifying at least one condition related to one of one or more devices to initiate an instant message communication between one of the one or more devices and one of one or more computing systems. An instant message service is invoked based on the identified condition and an instant message is generated based on the identified condition. The generated instant message is provided at the one of the computing systems in which the instant message communication has been initiated.

A computer readable medium having stored thereon instructions for managing one or more devices in accordance with other embodiments of the present invention includes identifying at least one condition related to one of one or more devices to initiate an instant message communication between one of the one or more devices and one of one or more computing systems. An instant message service is invoked based on the identified condition and an instant message is generated based on the identified condition. The generated instant message is provided at the one of the computing systems in which the instant message communication has been initiated.

A system for managing one or more devices in accordance with other embodiments of the present invention includes an identification system, an invocation system, a messaging system, and a display system. The identification system identifies at least one condition related to one of one or more devices to initiate an instant message communication between one of the one or more devices and one of one or more computing systems. The invocation system invokes an instant message service based on the identified condition and the messaging system generates an instant message based on the identified condition. The display system provides the generated instant message at the one of the computing systems in which the instant message communication has been initiated.

The present invention provides a number of advantages including providing an effective, efficient, and easy to use method and system to monitor, manage, and diagnose one or more devices which may be at a remote location using an instant messaging system. Unlike prior solutions, the present invention eliminates the need, complexity and expense of a centralized server system and customized applications. Instead, with the present invention a user assigned appropriate privileges may directly contact a device and request current status, operating conditions, or invoke self-diagnostic routines using an instant messaging system or establish direct peer-to-peer connections.

DETAILED DESCRIPTION

Figure 1:
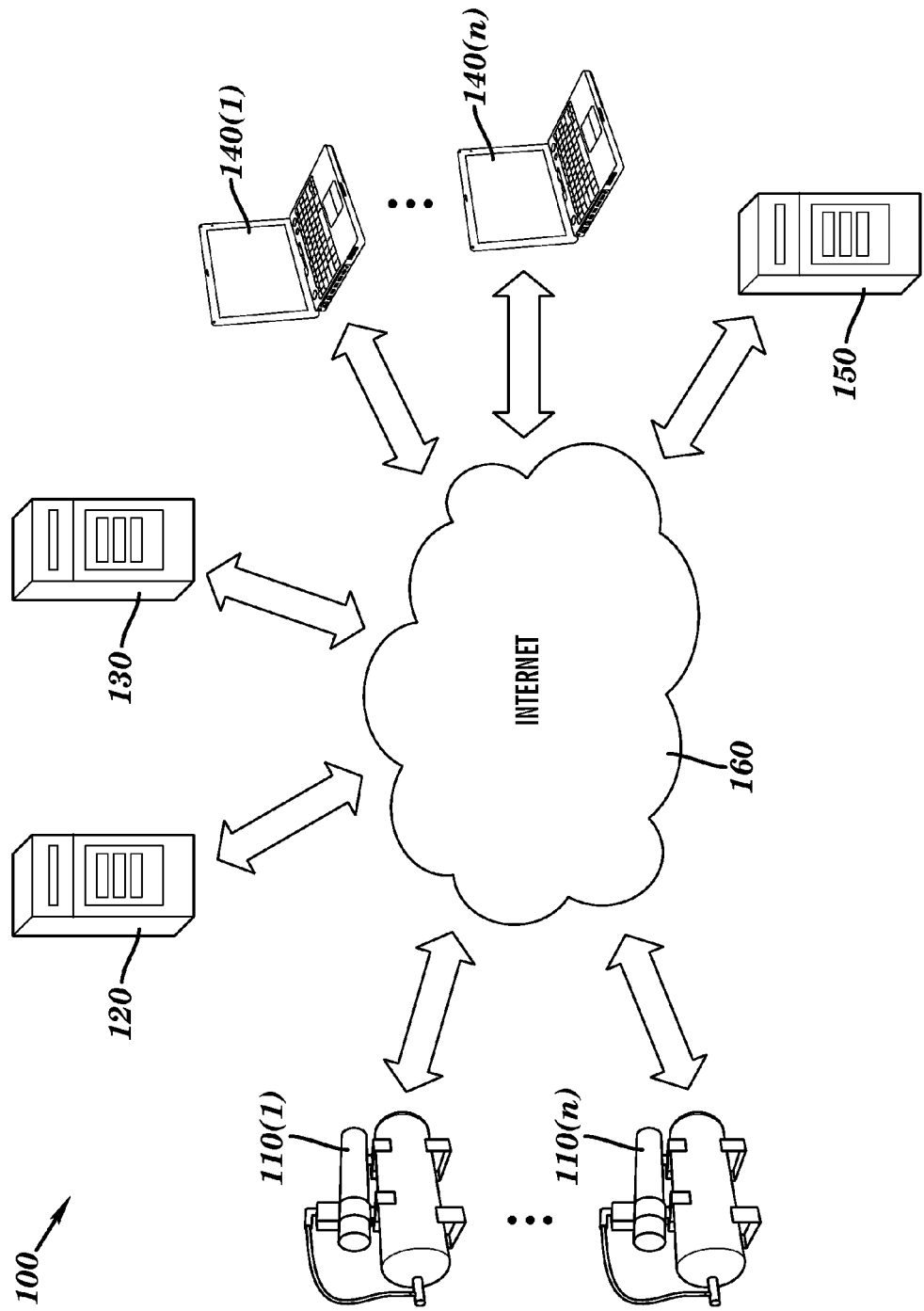
FIG. 1 is a block diagram of a system for managing one or more devices over an instant messaging network in accordance with embodiments of the present invention.

A system 100 for managing devices 110(1-n) in accordance with embodiments of the present invention is illustrated in FIG. 1. The system 100 includes the devices 110(1-n), a presence server 120, an audit server 130, user computing systems 140(1-n), autonomous management server 150, and a communications network 160, although the system 100 can include other types and numbers of components, devices, systems and/or servers configured in other manners. The present invention provides a number of advantages including providing an effective, efficient, and easy to use method and system to monitor, manage, and diagnose one or more devices using an instant messaging system.

Referring more specifically to FIG. 1, the devices 110(1-n) are located remotely from the user computing systems 140(1-n), although other types and numbers of components, devices, systems, and/or servers which are in other locations and proximities with could be used. By way of example only, the devices 110(1-n) may comprise machines, production tools, hospital equipment, office equipment, monitoring devices, computer systems, or vehicles. Each of the devices 110(1-n) autonomously and regularly initiates a connection to announce its presence to the presence server 120, although other manners for identifying the presence of one or more of the devices 100(1-n) could be used.

Each of the devices 110(1-n) may also monitor values of one or more parameters related to the devices 110(1-n), such as parameters relating to the operation of each of the devices 110(1-n), although other numbers of the devices 110(1-n) could monitor values for any number and type of parameter or characteristic. By way of example only, if the devices 110(1-n) comprise office equipment, the one or more parameters monitored for each of the devices 110(1-n) could comprise monitoring a current level of consumables or an operating condition for the office equipment.

Further, each of the devices 110(1-n) monitors for one or more fault or abnormal conditions related to the devices 110(1-n), although one or more of the devices 110(1-n) could monitor for other numbers and types of conditions. Each of the devices 110(1-n) stores a threshold value associated with each of the parameters, although the threshold values could be stored at other locations or obtained in other manners, such as by user input. When one or more of the threshold values in one of the devices 110(1-n) is surpassed, the one of the devices 110(1-n) determines a fault or abnormal condition exists, although other manners for identifying a fault or abnormal condition could be used. When a fault condition is identified in one of the devices 110(1-n), the one of the devices 100(1-n) autonomously initiates an instant message that is sent out to one or more of the user computing systems 140(1-n) stored in a buddy list with the one of the devices 110(1-n), although other manners for initiating the instant message and identifying the one or more recipients of the message could be used. The format of the instant message initiated by the one of the devices 110(1-n) is an XML message with embedded SOAP encoding so that it invokes a instant messaging web service at the one or more user computing systems 140(1-n) designated as a recipient, although other types of messages and communication systems could be used.

Each of the devices 110(1-n) includes a central processing unit (CPU) or processor, a memory, and an interface system which are coupled together by a bus or other link, although other numbers and types of each of the components and other configurations and locations for the components can be used. The processor in each of the devices 110(1-n) executes a program of stored instructions for one or more aspects of the present invention as described herein, including for autonomously and regularly initiating a connection to announce the devices 110(1-n) presence on the communication system 160, monitoring values for one or more parameters related to the devices 110(1-n), and monitoring for one or more fault or abnormal conditions related to the devices 110(1-n). The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory. The interface system in each of the devices 110(1-n) is used to operatively couple and communicate between the devices 110(1-n) and the presence server 120, the audit server 130, the user computing systems 140(1-n), and the autonomous management server 150, although other numbers and types of connections to other devices, systems, and servers could be used.

The presence server 120 is responsible for monitoring what devices 110(1-n) and user computing systems 140(1-n) are currently online/offline and delivering an indication of such through an instant message style client running on one of the user computing systems 140(1-n), although other manners for monitoring the status of the devices 110(1-n) and user computing systems 140(1-n) could be used. The presence server 120 also creates and maintains connection and contact information to enable devices 110(1-n) and user computing systems 140(1-n) to communicate, although this connection and contact information can be created and maintained in other manners. The presence server 120 enables the establishment of direct connections between the devices 110(1-n) and the user computing systems 140(1-n) from behind typical intranet security measures, including firewalls, Internet proxies and NATs, using well known techniques such as "Simple Traversal of UDP (User Datagram Protocol) through NATs (Network Address Translators)" (STUN) and Traversal Using Relay NAT (TURN). These connections established by the presence server 120 can be transient, for example to deliver a short instant message style message, or long-term, for example to allow for file sharing, remote desktop sessions, or tunneling remote diagnostics.

The presence server 120 includes a central processing unit (CPU) or processor, a memory, and an interface system which are coupled together by a bus or other link, although other numbers and types of each of the components and other configurations and locations for the components can be used. The processor in the presence server 120 executes a program of stored instructions for one or more aspects of the present invention as described herein, including monitoring what devices 110(1-n) and user computing systems 140(1-n) are currently online/offline and delivering an indication of such and creating and maintaining connection and contact information to enable devices 110(1-n) and user computing systems 140(1-n) to communicate. The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used. The interface system in the presence server 120 is used to operatively couple and communicate between the presence server 120 and the devices 110(1-n), the audit server 130, the user computing systems 140(1-n), and the autonomous management server 150, although other numbers and types of connections to other devices, systems, and servers could be used.

The audit server 130 records a log of all activities that take place between one or more of the devices 110(1-n) and one or more of the user computing systems 140(1-n), although other types and amounts of information could be recorded by the audit server 130. By way of example only, this information can comprise the specifics of the activity, the initiator of the activity, and a timestamp indicating when the activity took place.

The audit server 130 includes a central processing unit (CPU) or processor, a memory, and an interface system which are coupled together by a bus or other link, although other numbers and types of each of the components and other configurations and locations for the components can be used. The processor in the audit server 130 executes a program of stored instructions for one or more aspects of the present invention as described herein, including recording a log of all activities that take place between one or more of the devices 110(1-n) and one or more of the user computing systems 140(1-n). The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory. The interface system in the audit server 130 is used to operatively couple and communicate between the audit server 130 and the devices 110(1-n), the presence server 120, the user computing systems 140(1-n), and the autonomous management server 150, although other numbers and types of connections to other devices, systems, and servers could be used.

Each of the user computing systems 140(1-n) enables a user or operator to establish a peer-to-peer communication with one or more of the devices 110(1-n) to be notified of a fault or abnormal condition, request and receive values for one or more parameters at one or more of the devices 110(1-n), and run and obtain information from one or more diagnostics executed at one or more of the devices 110(1), although the user computing systems 140(1-n) could be used by an operator for other types and numbers of functions.

Each of the user computing systems 140(1-n) includes a central processing unit (CPU) or processor, a memory, an interface system, a user input system, and a display system which are coupled together by a bus or other link, although each of the user computing systems 140(1-n) can comprise other numbers and types of components and systems in other configurations. The processor in each of the user computing systems 140(1-n) executes a program of stored instructions for one or more aspects of the present invention as described and illustrated herein, including receiving notification of a fault or abnormal condition, requesting and receiving values for one or more parameters at one or more of the devices 110(1-n), and running and obtaining information from one or more diagnostics executed at one or more of the devices 110(1), although the processor could execute other types of programmed instructions. The memory in each of the user computing systems 140(1-n) stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one of the processor, can be used for the memory. The interface system in each of the user computing systems 140(1-n) is used to operatively couple and communicate between each of the user computing systems 140(1-n) and the devices 110(1-n), the presence server 120, the audit server 130, and the autonomous management server 150, although other numbers and types of connections to other devices, systems, and servers could be used.

The user input device in each of the user computing systems 140(1-n) is used to input selections, such as which of the devices 110(1-n) are being monitored, managed, or diagnosed, which parameters to check, and which diagnostics to run on which of the devices 110(1-n), although other types of data could be input. The user input device comprises a computer keyboard and a computer mouse, although other types and numbers of user input devices can be used. The display system in each of the user computing systems 140(1-n) is used to show data and information to the user, such as a detected fault or abnormal condition at one or more of the devices 110(1-n), values for one or more selected parameters at one or more of the devices 110(1-n), or data from diagnostics run at one or more of the devices 110(1-n), although other types of data and information could be displayed and other manners of providing the information can be used. The display system comprises a computer display screen, such as a CRT or LCD screen by way of example only, although other types and numbers of displays could be used, such as a printer.

The optional autonomous management server 150 provides a twenty-four hour and seven day a week monitoring service that automatically establish a peer-to-peer connection with one or more of the devices 110(1-n) and request certain values for one or more parameters or run and obtain information from one or more diagnostics at one or more of the devices 110(1-n), although the autonomous management server 150 could perform other types and numbers of functions. Once the communication is completed, the autonomous management server 150 would close the peer-to-peer connection. Additionally, the autonomous management server 150 could perform a periodic analysis on the obtained information returned from the one of the devices 110(1-n) and based on this historical information make predictions, such as failure events or maintenance times.

The autonomous management server 150 includes a central processing unit (CPU) or processor, a memory, and an interface system which are coupled together by a bus or other link, although other numbers and types of each of the components and other configurations and locations for the components can be used. The processor in the autonomous management server 150 executes a program of stored instructions for one or more aspects of the present invention as described herein, including automatically establishing a peer-to-peer connection with one or more of the devices 110(1-n) and requesting certain values for one or more parameters or running and obtaining information from one or more diagnostics at one or more of the devices 110(1-n). The memory stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory. The interface system in the autonomous management server 150 is used to operatively couple and communicate between the autonomous management server 150 and the devices 110(1-n), the presence server 120, the audit server 130, and the user computing systems 140(1-n), although other numbers and types of connections to other devices, systems, and servers could be used.

The communications network 160 comprises the Internet, although other types and numbers of communication systems, such as a direct connection, a local area network, a wide area network, modems and phone lines, e-mails, and/or wireless communication technology each having their own communications protocols, in other configurations could be used. In this particular embodiment, the communications network 160 uses industry-standard protocols including SOAP, XML, and HTTP , although other types of communications protocols and techniques such as Representational State Transfer (REST) could be used.

Although an example of embodiments of the devices 110(1-n), the presence server 120, the audit server 130, the user computing systems 140(1-n), and the autonomous management server 150 are described and illustrated herein, each could be implemented on any suitable device, system, or server. It is to be understood that the devices, systems, and servers of the exemplary embodiments are for exemplary purposes, as many variations of the specific hardware and software used to implement the exemplary embodiments are possible, as will be appreciated by those skilled in the relevant art(s).

Furthermore, each of the devices, systems, and servers of the present invention may be conveniently implemented using one or more general purpose computer systems, microprocessors, digital signal processors, micro-controllers, and the like, programmed according to the teachings of the present invention as described and illustrated herein, as will be appreciated by those skilled in the computer and software arts.

In addition, two or more computing devices, systems, or servers can be substituted for any one of the devices, systems, or servers in any embodiment of the present invention. Accordingly, principles and advantages of distributed processing, such as redundancy, replication, and the like, also can be implemented, as desired, to increase the robustness and performance the devices and systems of the exemplary embodiments. The present invention may also be implemented on one or more of any devices, systems or servers that extend across any network using any suitable interface mechanisms and communications technologies including, for example telecommunications in any suitable form (e.g., voice, modem, and the like), wireless communications media, wireless communications networks, cellular communications networks, G3 communications networks, Public Switched Telephone Network (PSTNs), Packet Data Networks (PDNs), the Internet, intranets, a combination thereof, and the like.

The present invention may also be embodied as a computer readable medium having instructions stored thereon for predictive capacity planning as described herein, which when executed by a processor, cause the processor to carry out the steps necessary to implement the methods of the present invention as described and illustrated herein.

Figure 2:
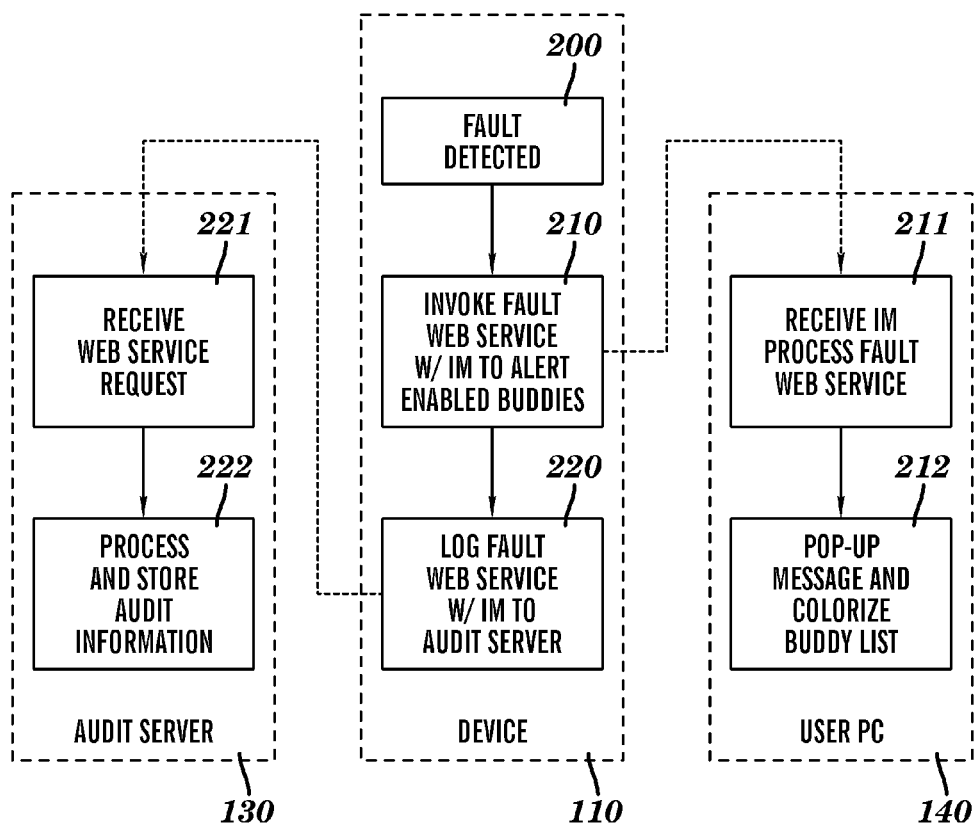
FIG. 2 is a flowchart of a method for detecting and providing an indication of a fault or abnormal condition at one or more devices using a peer-to-peer connection.

Referring to FIG. 2, a method for detecting and providing an indication of a fault or abnormal condition at one or more devices 110(1-n) using a peer-to-peer connection is illustrated. At step 200, each of the devices 110(1-n) monitors for one or more fault or abnormal conditions, although other numbers and types of the devices, systems, components, and servers could monitor for one or more conditions and other numbers and types of conditions which could be initiated in other manners could be used. By way of example only, other conditions can include a need to transfer one or more files from one of the devices 110(1-n) to one or more of the user computing systems 140(1-n), a need to update a value of properties associated with one of the devices 110(1-n), a need to transfer a history or event log for one of the devices 110 (1-n). Additionally, other conditions could comprise a receipt of a user input from a computer system, such as one of the user computing systems 140(1-n), the autonomous management server 150, or one of the devices 110(1-n), and to initiate an instant message targeted towards one or more devices or an autonomous request from a computer system, such as one of the user computing systems 140(1-n), the autonomous management server 150, or one of the devices 110(1-n), to initiate an instant message targeted towards one or more devices as explained in greater detail herein, although again other types and numbers of conditions could trigger an instant messaging communication.

Each of the devices 110(1-n) has stored a threshold value for each of parameter associated with the device, although the threshold values could be stored and obtained in other manners. The devices 110(1-n) monitor a current value for each parameter and when one of the devices 110(1-n) detects that the current value has surpassed the threshold value, a fault or abnormal condition is detected, although other manners for identifying a fault or abnormal condition could be used.

At step 210, when a fault or abnormal condition is detected, the one of the devices 110(1-n) that detected the condition retrieves a buddy list of one or more recipients at one or more of the user computing systems 140(1-n) for receiving notification of the condition, although other manners for determining intended recipients and other locations for storing the recipients could be used. Next, the one of the devices 110(1-n) that detected the condition queries the presence server 120 for information on how to make a direct connection to one or more computing systems 140 and/or autonomous management server. The one of the devices 110(1-n) creates a Simple Object Access Protocol (SOAP) message which is sent in the form of an instant message protocol message to each identified recipient at one or more of the user computing systems 140(1-n) retrieved from the buddy list, although other manners for initiating a communication using other services could be used. In this embodiment, the messaging web service follows the standards as defined by the Internet Engineering Task Force (IETF) using the Extensible markup Language (XML), Simple Object Access Protocol (SOAP) and Web Services Definition Language (WDSL).

Additionally, the one of the devices 110(1-n) that detected the fault or abnormal condition, generates an instant message with information about the fault or abnormal condition, such as the value of one or more parameters and a timestamp on when the fault or abnormal condition occurred, although other types and amounts of information could be provided. The one of the computing system 140(1-n) that receives the message determines whether one or more characteristics of the instant message or buddy list display should be altered, such as by coloring the text red and/or making the font bold, based on a comparison of information about the fault or condition against stored data, although other manners for determining when and how to alter one or more of the characteristics of the instant message can be used. By way of example only, if the fault or abnormal condition relates to a component which is designated as critical for the device or a current value is above or below a threshold value by a set amount or range, then the text of that device in the buddy list may be colored red and the text put in bold.

Following step 210, in step 211 each of the user computing systems 140(1-n) which has been identified as a recipient of the instant message about the fault or abnormal condition, receives the instant message protocol message. Next, at step 212, the invocation of the web service by each of the identified user computing systems 140(1-n) results in a pop-up instant message which contains the generated message from the one of the devices 110(1-n) that detected the fault or abnormal condition.

Additionally, following step 210, in step 220 the one of the devices 110(1-n) that detected the condition also creates a SOAP message to invoke the logging web service at the audit server 130 and sends this instant message protocol message to the audit server 130, although other manners for initiating storage of information regarding the communication can be used.

At step 221, the audit server 130 receives the logging service request and determines if a log for the one of the devices 110(1-n) that detected the condition should be recorded. If the audit server 130 determines a log should be recorded for the one of the devices that detected the condition, then at step 222 the audit server 130 stores the audit information, although the audit information could be received from other sources and stored in other locations. The audit information comprises information on the communications between the one of the devices 110(1-n) that detected the fault or abnormal condition and each of the user computing systems 140(1-n) identified as a recipient of the notification of the condition, although other types of information could be stored. By way of example only, this information may include the initiator of the request, the type of request, the result of the request and the timestamp for the communications.

Figure 3:
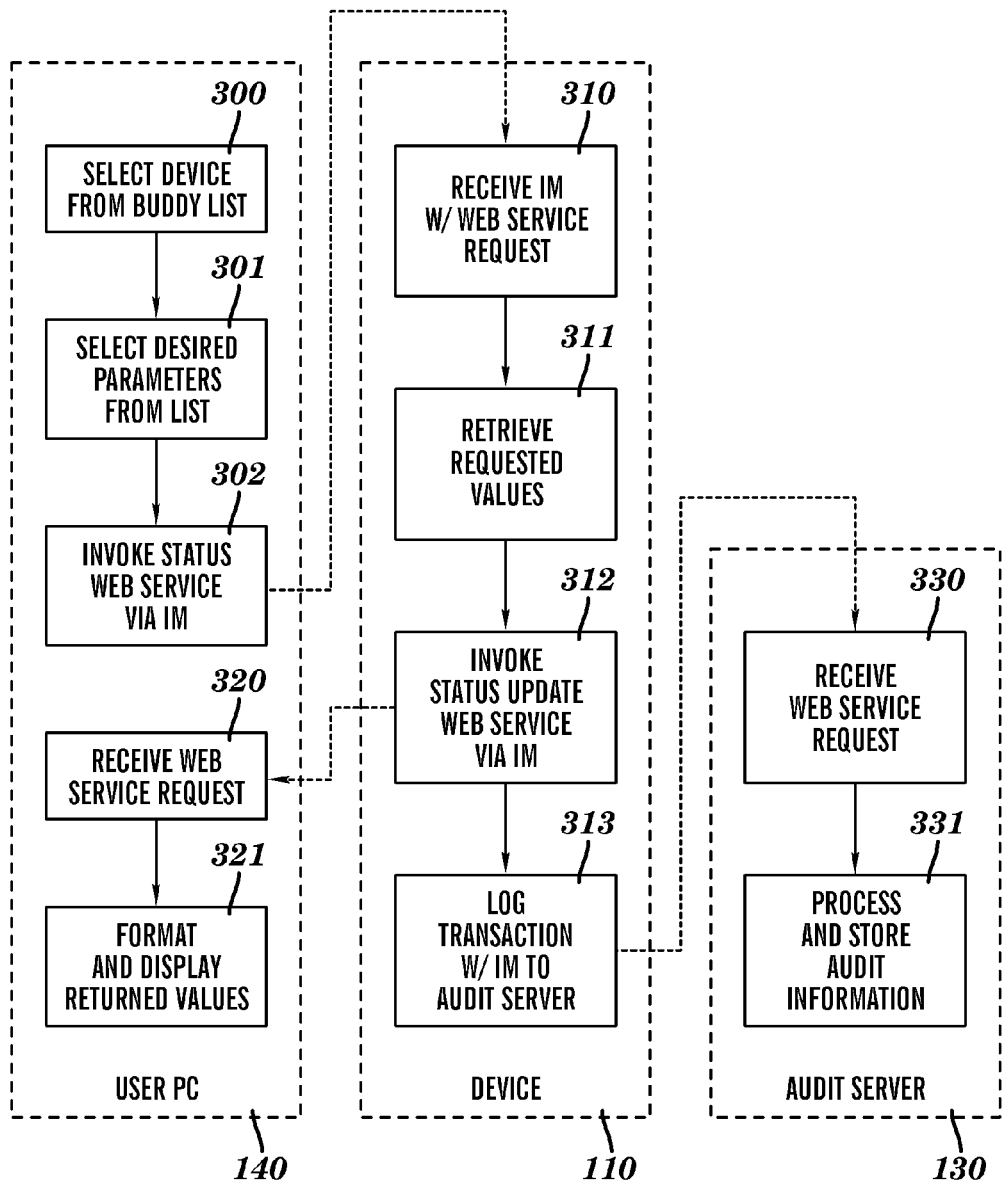
FIG. 3 is a flowchart of a method for requesting and receiving one or more values for one or more parameters from one or more devices using a peer-to-peer connection.

Referring to FIG. 3, a method for requesting and receiving one or more values for one or more parameters from one or more devices using a peer-to-peer connection 110(1-n) is illustrated. Although the method described herein is in executed in response to user input, one or more computer systems could autonomously carry out the method described herein. At step 300, a user at one of the user computing systems 140(1-n) retrieves a buddy list of one or more devices 110(1-n) the user can interact with, although other manners for identifying devices the user computing system can interact with and other locations for storing the list could be used. Next, the user at one of the user computing systems 140(1-n) selects one or more of the devices 110(1-n) to establish an instant message communication, although other manners for making the selection could be used, such as having an automated selection of the devices, parameters, and actions by a computing system without user involvement.

At step 301, the user at one of the user computing systems 140(1-n), retrieves a list of parameters associated with each of the selected ones of devices 110(1-n) and selects an action with respect to these parameters, although other manners for obtaining and selecting the one or more parameters and other types of items could be used. By way of example only, the user at one of the user computing systems 140(1-n) might select a parameter for operating temperatures of critical components in one of the devices and may select the action, "Get Current Values," although other numbers and types of parameters and actions could be selected. Next, the one of the user computing systems 110(1-n) that selected the devices 110(1-n), generates an instant message with information about the selected parameter and action, although the message could contain other types and amounts of information.

At step 302, the user computing system 140(1-n) that selected one or more of the devices 110(1-n) creates a Simple Object Access Protocol (SOAP) message which is sent in the form of an instant message protocol message to each of the selected ones of devices 110(1-n), although other manners for initiating a communication using other services could be used.

At step 310, each of the selected ones of devices 110(1-n) which has been identified as a recipient of the instant message, receives the instant message protocol message.

At step 311, each of the selected ones of devices 110(1-n) processes the received instant message to retrieve the one or more selected parameters and actions embedded in the message, although other types of processing of the received message can be conducted. Next, in response to the processed message, each of the selected ones of devices 110(1-n) retrieves the current value of the requested parameters, although the selected ones of devices 110(1-n) can be instructed to perform other types and numbers of functions.

At step 312, each of the selected ones of devices 110(1) uses the instant message protocol to invoke the web service to send an instant message with the retrieved current values back to the one of the user computing systems 140(1-n) that initiated the communication, although other manners for initiating a communication using other services and other types of messages could be used. The selected ones of devices 110(1-n) generates an instant message with information about retrieved current values for the selected parameters, although the message could contain other types and amounts of information could be provided.

At step 320, the one of the user computing systems 140(1-n) that initiated the communication receives the instant message protocol message. In response to this instant message protocol message, the one of the user computing systems 140(1-n) that initiated the communication invokes a messaging web service at presence server 120 to transmit the generated instant message, although other manners for initiating a communication using other services could be used. The invocation of the web service by the one of the user computing systems 140(1-n) that initiated the communication results in an instant message which contains the current values of the selected parameters from the selected ones of devices 110(1-n), although other types and amounts of information could be provided.

Additionally, following step 312, in step 313 the selected ones of devices 110(1-n) that obtained the current values for the selected parameters also creates a SOAP message to invoke the logging web service at the audit server 130 and sends this instant message protocol message to the audit server 130, although other manners for initiating storage of information regarding the communication can be used.

At step 330, the audit server 130 receives the logging service request and determines if a log for the selected ones of devices 110(1-n) should be recorded. If the audit server 130 determines a log should be recorded for the selected ones of devices 110(1-n), then at step 331 the audit server 130 stores the audit information, although the audit information could be received from other sources and stored in other locations. The audit information comprises information on the communications between the one of the user computing systems 140(1-n) that initiated the communication and the selected ones of devices 110(1-n), although other types of information could be stored.

Figure 4:
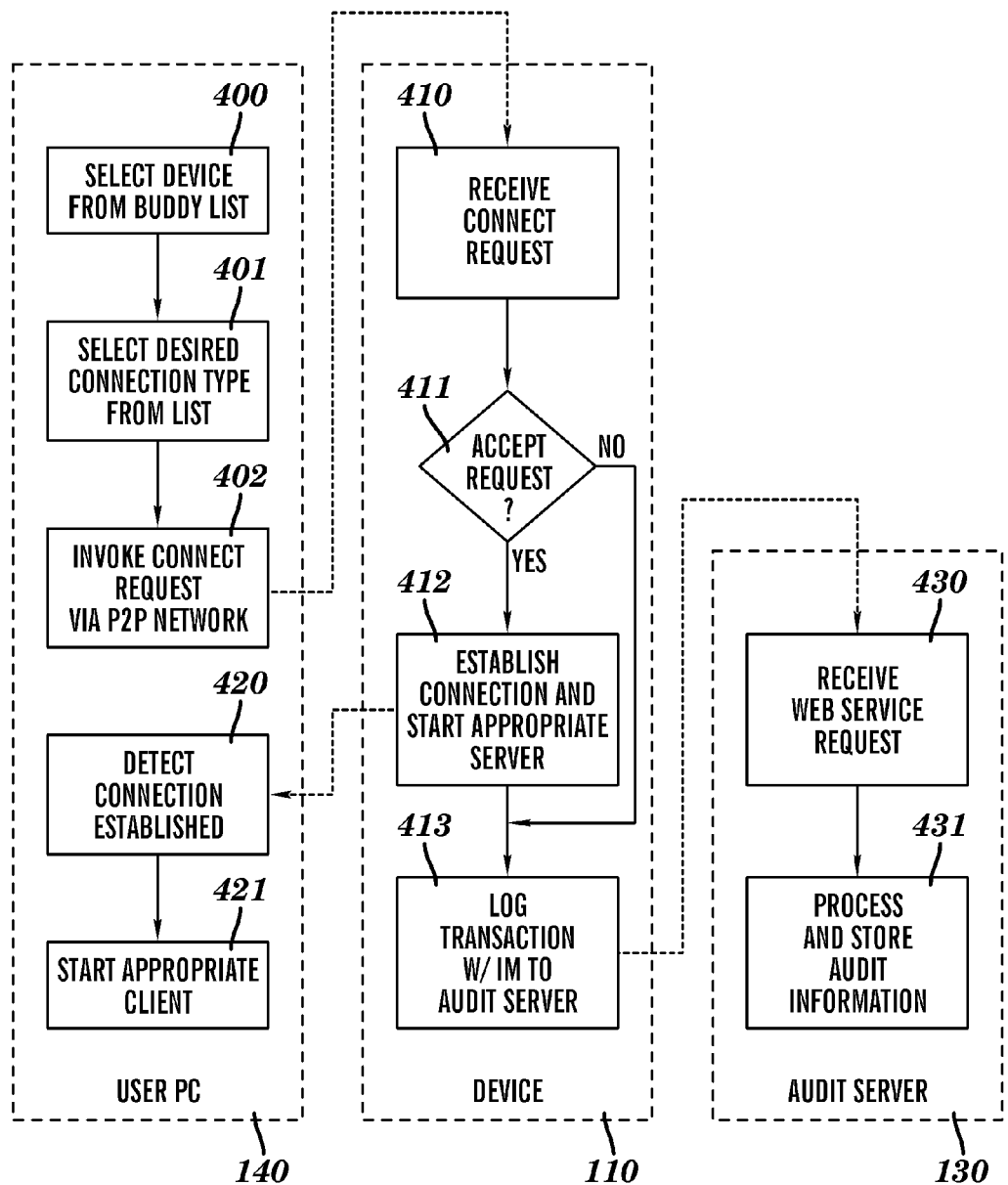
FIG. 4 is a flowchart of a method for running and obtaining information from one or more diagnostics at one or more devices using a peer-to-peer connection.

Referring to FIG. 4, a method for running and obtaining information from one or more diagnostics at one or more devices using a peer-to-peer connection is illustrated. At step 400, a user at one of the user computing systems 140(1-n) retrieves a buddy list of one or more devices 110(1-n), although other manners for identifying devices the user computing system can interact with and other locations for storing the list could be used. Next, the user at one of the user computing systems 140(1-n) selects one or more of the devices 110(1-n) to establish an instant message communication, although other manners for making the selection could be used, such as having an automated selection of the devices 110(1-n) and diagnostics.

At 401, the user at one of the user computing systems 140(1-n) selects what action or connection the user is interested in, although other manners for obtaining and selecting the parameters and other types of items could be used. By way of example only, the available options might be: "Start Remote Desktop;" "Connect to Web Based UI;" or "Run System Diagnostic Application," although other types and numbers of action could be selected. Next, the one of the user computing systems 110(1-n) that selected the devices 110(1-n), generates an instant message with information about the selected action, although the message could contain other types and amounts of information.

At step 402, the user computing system 140(1-n) that selected one or more of the devices 110(1-n) uses the connection information obtained from the presence server 120 and creates a Simple Object Access Protocol (SOAP) message which is sent in the form of an instant message protocol message to each of the selected ones of the devices 110(1-n), although other manners for initiating a communication using other services could be used.

At step 410, each of the selected ones of devices 110(1-n) which has been identified as a recipient of the instant message, receives the instant message protocol message. Next, at step 411 each of the selected ones of devices 110(1-n) verifies that the one of the user computing systems 140(1-n) making the request has the appropriate permission to establish this type of direct connection. If in step 411, each of the selected ones of devices 110(1-n) determines that the one of the user computing systems 140(1-n) making the request does not have permission, then the No branch is taken to step 413 where the attempted communication is logged as described in greater detail below. If in step 411, each of the selected ones of devices 110(1-n) determines that the one of the user computing systems 140(1-n) making the request does have permission, then the Yes branch is taken to step 412.

In step 412, in response to this instant message protocol message each of the selected ones of the devices 110(1-n) accepts the peer-to-peer connection request and establishes the connection. After establishing the connection, the selected ones of the devices 110(1-n), proceeds to step 420

At step 420, the initiated computing system 140(1-n) receive acknowledgement that the connection is established. Next, at step 421 the selected ones of the devices 110(1-n) process the generated instant message to retrieve action or actions, such as running a diagnostic application, although other types of processing of the received message can be conducted. Next, in response to the processed message, each of the selected ones of devices 110(1-n) executes the received action or actions, such as allowing the user to remotely run a device specific diagnostic application and establish a direct chat session and/or voice channel with the operator of the device using the instant messaging, although the selected ones of devices 110(1-n) can be instructed to perform other types and numbers of functions. By way of example only, the action can include "Query Device," "Direct Connect to Device," "Transfer Files," "Talk to Device Operator," and "Instant Message Chat with Operator," although other types of actions and connections can be executed. In response to the selected actions, each of the selected ones of devices 110(1-n) uses the established peer-to-peer connection to communicate back with the one of the user computing systems 140(1-n) that initiated the communication regarding the selected action or actions in the manner described earlier.

Additionally, following step 412, in step 413 the selected ones of devices 110(1-n) creates a SOAP message to invokes the logging web service at the audit server 130 and sends this instant message protocol message to the audit server 130, although other manners for initiating storage of information regarding the communication can be used.

At step 430, the audit server 130 receives the logging service request and determines if a log for the selected ones of devices 110(1-n) that detected the condition should be recorded. If the audit server 130 determines a log should be recorded for the one of the devices that detected the condition, then at step 222 the audit server 130 stores the audit information, although the audit information could be received from other sources and stored in other locations. The audit information comprises information on the communications between the selected ones of the devices 110(1-n) and the user computing system 140(1-n) that initiated the communication, although other types of information could be stored.

Accordingly, the present invention provides a mechanism for remote monitoring and diagnostics of field equipment via the invocation of web services using a peer-to-peer instant messaging protocol or system through a familiar instant message style user interface. The web services are invoked by establishing a transient, direct peer-to-peer connection to one or more of the devices 110(1-n). In addition, the system 100 provides for a longer term direct peer-to-peer connection of field devices or equipment to allow for the remote use of related client-server and peer-to-peer applications, such as remote desktop sharing, Voice over IP, and device specific proprietary diagnostic applications by way of example only.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing one or more devices, the method comprising:
   identifying at least one condition related to one of one or more devices to initiate an instant message communication between one of the one or more devices and one of one or more computing systems;
   invoking an instant message service based on the identified condition;
   generating an instant message based on the identified condition; and
   providing the generated instant message at the one of the computing systems in which the instant message communication has been initiated.

2. The method as set forth in claim 1 further comprising identifying a presence of one or more devices and one or more computing systems on a network, wherein the invoking is based on the identified presence of the one or more devices and the one or more computing systems.

3. The method as set forth in claim 2 wherein the identifying a presence further comprises autonomously announcing the presence of at least one of the devices and the computing systems on the network.

4. The method as set forth in claim 1 wherein the identified condition comprises at least one of a fault condition and an abnormal condition at one of the one or more devices and wherein the generated instant message provides a report of the at least one of a fault condition and an abnormal condition.

5. The method as set forth in claim 4 further comprising identifying one or more of the computing systems on a buddy list associated with the device associated with the identified condition, wherein the providing the instant message is provided to the one or more of the computing systems identified on the buddy list, and wherein the invoking invokes the one or more of the computing systems identified on the buddy list based on a SOAP encoded message in the instant message.

6. The method as set forth in claim 1 wherein the identified condition comprises a request from one of the computing systems to retrieve one or more values for one or more parameters at one of the devices.

7. The method as set forth in claim 6 further comprising obtaining the one or more values for the one or more parameters at the one of the devices and wherein the generated instant message contains the obtained one or more values.

8. The method as set forth in claim 1 wherein the identified condition comprises a request from one of the computing systems for one or more diagnostics at one of the devices.

9. The method as set forth in claim 8 further comprising:
   running the one or more requested diagnostics; and
   obtaining data from the running, wherein the generated instant message contains the obtained data from the requested diagnostics.

10. The method as set forth in claim 1 wherein the providing the instant message further comprises providing at least one of a plurality of characteristics in a display of the instant message based on the content of the instant message.

11. The method as set forth in claim 1 further comprising recording audit information based on the generated message.

12. A computer readable medium having stored thereon instructions for managing one or more devices comprising machine executable code which when executed by at least one processor, causes the processor to perform steps comprising:
   identifying at least one condition related to one of one or more devices to initiate an instant message communication between one of the one or more devices and one of one or more computing systems;
   invoking an instant message service based on the identified condition;
   generating an instant message based on the identified condition; and
   providing the generated instant message at the one of the computing systems in which the instant message communication has been initiated.

13. The medium as set forth in claim 12 further comprising identifying a presence of one or more devices and one or more computing systems on a network, wherein the invoking is based on the identified presence of the one or more devices and the one or more computing systems.

14. The medium as set forth in claim 13 wherein the identifying a presence further comprises autonomously announcing the presence of at least one of the devices and the computing systems on the network.

15. The medium as set forth in claim 12 wherein the identified condition comprises at least one of a fault condition and an abnormal condition at one of the one or more devices and wherein the generated instant message provides a report of the at least one of a fault condition and an abnormal condition.

16. The medium as set forth in claim 15 further comprising identifying one or more of the computing systems on a buddy list associated with the device associated with the identified condition, wherein the providing the instant message is provided to the one or more of the computing systems identified on the buddy list, and wherein the invoking invokes the one or more of the computing systems identified on the buddy list based on a SOAP encoded message in the instant message.

17. The medium as set forth in claim 12 wherein the identified condition comprises a request from one of the computing systems to retrieve one or more values for one or more parameters at one of the devices.

18. The medium as set forth in claim 17 further comprising obtaining the one or more values for the one or more parameters at the one of the devices and wherein the generated instant message contains the obtained one or more values.

19. The medium as set forth in claim 12 wherein the identified condition comprises a request from one of the computing systems for one or more diagnostics at one of the devices.

20. The medium as set forth in claim 19 further comprising:
   running the one or more requested diagnostics; and
   obtaining data from the running, wherein the generated instant message contains the obtained data from the requested diagnostics.

21. The medium as set forth in claim 12 wherein the providing the instant message further comprises providing at least one of a plurality of characteristics in a display of the instant message based on the content of the instant message.

22. The medium as set forth in claim 12 further comprising recording audit information based on the generated instant message.

23. A system for managing one or more devices, the system comprising:
   an identification system that identifies at least one condition related to one of one or more devices to initiate an instant message communication between one of the one or more devices and one of one or more computing systems;
   an invocation system that invokes an instant message service based on the identified condition;
   a messaging system that generates an instant message based on the identified condition; and
   a display system that provides the generated instant message at the one of the computing systems in which the instant message communication has been initiated.

24. The system as set forth in claim 23 wherein the identification system identifies a presence of one or more devices and one or more computing systems on a network, wherein the invocation system invokes based on the identified presence of the one or more devices and the one or more computing systems.

25. The system as set forth in claim 24 wherein the identification system further comprises an autonomous notification system that autonomously announces the presence of at least one of the devices and the computing systems on the network.

26. The system as set forth in claim 23 wherein the identified condition comprises at least one of a fault condition and an abnormal condition at one of the one or more devices and wherein the generated instant message provides a report of the at least one of a fault condition and an abnormal condition.

27. The system as set forth in claim 26 wherein the identification system identifies one or more of the computing systems on a buddy list associated with the device associated with the identified condition, wherein the display system provides the instant message to the one or more of the computing systems identified on the buddy list, and wherein the invocation system invokes the one or more of the computing systems identified on the buddy list based on a SOAP encoded message in the instant message.

28. The system as set forth in claim 23 wherein the identified condition comprises a request from one of the computing systems to retrieve one or more values for one or more parameters at one of the devices.

29. The system as set forth in claim 28 further comprising a parameter processing system that obtains the one or more values for the one or more parameters at the one of the devices and wherein the messaging system generates the instant message with the obtained one or more values.

30. The system as set forth in claim 23 wherein the identified condition comprises a request from one of the computing systems for one or more diagnostics at one of the devices.

31. The system as set forth in claim 30 further comprising a diagnostic processing system that runs the one or more requested diagnostics and obtains data from the diagnostics which are run, wherein the generated instant message contains the obtained data from the requested diagnostics.

32. The system as set forth in claim 23 wherein the display system provides at least one of a plurality of characteristics in the display of the instant message based on the content of the instant message.

33. The system as set forth in claim 23 further comprising an audit system that records audit information based on the generated instant message.

* * * * *